US008459388B2

(12) United States Patent  
Kim

(10) Patent No.: US 8,459,388 B2  
(45) Date of Patent: Jun. 11, 2013

(54) EVAPORATION CYCLE HEAT EXCHANGE SYSTEM FOR VEHICLE

(75) Inventor: Jae Yeon Kim, Gyunggi-Do (KR)

(73) Assignee: Hyundai Motor Company, Seoul (KR)

( * ) Notice: Subject to any disclaimer, the term of this patent is extended or adjusted under 35 U.S.C. 154(b) by 697 days.

(21) Appl. No.: 12/569,312

(22) Filed: Sep. 29, 2009

(65) Prior Publication Data  
US 2010/0126438 A1 May 27, 2010

(30) Foreign Application Priority Data  
Nov. 26, 2008 (KR) .......................... 10-2008-0118278

(51) Int. Cl.  
B60K 11/00 (2006.01)

(52) U.S. Cl.  
USPC .......................................................... 180/68.4

(58) Field of Classification Search  
USPC .................................... 180/68.1, 68.4; 165/41  
See application file for complete search history.

(56) References Cited

U.S. PATENT DOCUMENTS

2006/0113851 A1* 6/2006 Ishihara et al. ................. 310/52  
2008/0112137 A1* 5/2008 Ko ................................. 361/700

FOREIGN PATENT DOCUMENTS

| JP | 2001-263061 A | 9/2001 |
| JP | 2001-342838 A | 12/2001 |
| JP | 2002-340161 A | 11/2002 |
| JP | 2005-090349 A | 4/2005 |
| JP | 2006-002588 A | 1/2006 |
| JP | 2006-125375 A | 5/2006 |
| JP | 2006-144703 A | 6/2006 |
| JP | 2008-008224 A | 1/2008 |

* cited by examiner

Primary Examiner — Katy M Ebner  
(74) Attorney, Agent, or Firm — Morgan, Lewis & Bockius LLP

(57) ABSTRACT

An evaporation cycle heat exchange system for a vehicle is provided. The evaporation cycle heat exchange system is a new type of cooling system that cools vehicle electronic components, a fuel cell stack, an internal combustion engine, an automatic transmission, a turbocharger, etc. using an evaporative heat exchanger, thus improving cooling efficiency and reducing the size of components such as a radiator. The evaporation cycle heat exchange system cools coolant circulating through a vehicle cooling system by employing an evaporative heat exchanger in which a working fluid flows by a pressure difference caused by volume expansion and capillary phenomenon. Accordingly, it is possible to improve the cooling efficiency of the entire cooling system, reduce the size of components to comply with pedestrian protection regulations, improve fuel efficiency, and ensure the stability of the system. Moreover, the present invention provides an evaporation cycle heat exchange system for a vehicle, in which a product-integrated or line-integrated evaporative heat exchanger capable of being mounted in various vehicle components such as an inverter, a fuel cell stack, an oil fan of an internal combustion engine, a turbocharger, an automatic transmission oil fan, etc. is employed. Accordingly, it is possible to easily apply the evaporative heat exchanger to various vehicle components and various vehicle models, and thus it is possible to increase the degree of freedom of the design of the cooling system.

3 Claims, 18 Drawing Sheets

EVAPORATION CYCLE HEAT EXCHANGE SYSTEM FOR VEHICLE

CROSS-REFERENCE TO RELATED APPLICATION

The present application claims priority of Korean Patent Application Number 10-2008-0118278 filed Nov. 26, 2008, the entire contents of which application is incorporated herein for all purposes by this reference.

BACKGROUND OF THE INVENTION

1. Field of the Invention

The present disclosure relates to an evaporation cycle heat exchange system for a vehicle. More particularly, it relates to an evaporation cycle heat exchange system for a vehicle, which is a new type of cooling system that cools vehicle electronic components, a fuel cell stack, an internal combustion engine, an automatic transmission, a turbocharger, etc. using an evaporative heat exchanger, thus improving cooling efficiency and reducing the size of components such as a radiator.

2. Description of Related Art

The temperature of combustion gas in a cylinder of an internal combustion engine typically ranges from 2,000 to 2,500° C., and most of the heat from the hot combustion gas is transferred to engine components such as the cylinder, cylinder head, piston, values, and the like.

When the temperature of the components excessively increases, the strength of the components is decreased to cause engine trouble, the durability of the engine is reduced, and the combustion conditions of the engine become worse, thus reducing the engine's power.

Moreover, when the engine is over-cooled, the amount of heat lost by the cooling is large, and thus the efficiency of the engine is reduced and the amount of fuel used is increased. Accordingly, a cooling system to maintain the temperature of the engine at about 80 to 90° C. is provided in the vehicle.

A hybrid vehicle is driven by an electric motor during cruising, during gentle driving, or during cruising at low and medium speed and driven by both the internal combustion engine and the electric motor during acceleration and during rapid acceleration.

Moreover, the hybrid vehicle is driven by the internal combustion engine during cruising at high speed, thus improving fuel efficiency.

Such a hybrid vehicle includes a cooling system consisting of an electronic component cooling system and an internal combustion engine cooling system.

A fuel cell vehicle is driven by a fuel cell in which hydrogen and oxygen are combined in a chemical reaction to produce electricity and water, and the produced electricity is used as a power source.

Such a fuel cell vehicle includes a cooling system for removing waste heat from a fuel cell stack. The cooling system for the fuel cell vehicle has a structure in which a coolant such as pure water or water is supplied to a radiator by operation of a pump such that the radiator radiates the heat of the coolant to the outside using a fan or traveling wind.

Since the cooling systems of most vehicles employ the radiator, which transfers heat from the coolant to the air, it is difficult to improve the cooling efficiency, and the size or capacity of the radiator is increased.

FIG. 1 is a schematic diagram showing a cooling system of a hybrid vehicle.

As shown in FIG. 1, the cooling system of the hybrid vehicle includes an electronic component cooling system and an internal combustion engine cooling system, each having a coolant circulation passage which will be described below.

The electrical component cooling system has a coolant circulation passage in which the coolant is circulated through an inverter 15>a reservoir 16>an integrated starter-generator 17>an electronic component radiator 18>a water pump 12>and the inverter 15, that is, through reservoir 16, and so on back through inverter 15.

The internal combustion engine cooling system has a coolant circulation passage in which the coolant is circulated through an internal combustion engine 10>an internal combustion engine radiator 11>a water pump 12>and the internal combustion engine 10.

Here, reference numeral 13 denotes a cooling fan, and reference numeral 14 denotes a cooling module.

The efficiency of the radiator in the hybrid vehicle is increased when the temperature difference between fluids to be heat-exchanged is larger, and a thermal head generally does not exceed 10° C.

In the case of the internal combustion engine radiator, the temperature at an inlet side ranges from 100 to 110° C. and the temperature of outside air ranges from 40 to 45° C., and thus the temperature difference between two fluids is 55 to 70° C., which exhibits a relatively high cooling efficiency.

However, in the case of the electronic component radiator, the temperature at an inlet side ranges from 60 to 65° C. and the temperature of outside air ranges from 40 to 45° C., and thus the temperature difference between two fluids is 15 to 25° C., which causes deterioration of the cooling efficiency. Therefore, in order to provide a high capacity and a thermal head of about 10° C., a large-sized electronic component radiator is required, and another heat exchanger may not be disposed in front of the electronic component radiator to reduce the temperature of the flowing air.

FIG. 2 is a schematic diagram showing a cooling system of a fuel cell vehicle.

As shown in FIG. 2, the cooling system of the fuel cell vehicle includes an electronic component cooling system and a fuel cell stack cooling system, each having a coolant circulation passage which will be described below.

The electrical component cooling system has a coolant circulation passage in which the coolant is circulated through an inverter 15>a reservoir 16>a drive motor 23>an electronic component radiator 18>a water pump 12>and the inverter 15.

The fuel cell stack cooling system has a coolant circulation passage in which the coolant is circulated through a fuel cell stack 19>a reservoir 16>a fuel cell stack radiator 20>a water pump 12>and the fuel cell stack 19.

Here, reference numeral 13 denotes a cooling fan, and reference numeral 14 denotes a cooling module.

In the case of the fuel cell stack radiator mounted in the fuel cell vehicle, the temperature at an inlet side ranges 75 to 85° C. and the temperature of outside air ranges 40 to 45° C., and thus the temperature difference between two fluids is 30 to 45° C., which causes deterioration of the cooling efficiency ($Q=M'Cp\Delta T$). Therefore, in order to provide a thermal head of about 10° C., a large-sized fuel cell stack radiator is required, and another heat exchanger may not be disposed in front of the fuel cell stack radiator to reduce the temperature of the flowing air, thus increasing $\Delta T$. However, in the case where the electronic component radiator and an air conditioner condenser are positioned in front of the fuel cell stack radiator, it is difficult to improve the cooling efficiency.

Accordingly, the capacity of the radiator is increased to approximately two times that of the existing internal combustion engine radiator, or a cooling fan for a 1 KW high voltage motor is used (the capacity of a conventional cooling fan for an internal combustion engine is less than 250 W).

FIG. 3 is a schematic diagram showing a cooling system of an internal combustion engine vehicle.

As shown in FIG. 3, the cooling system of the internal combustion engine vehicle has a coolant circulation passage in which the coolant is circulated through an internal combustion engine 10>an internal combustion engine radiator 11>a water pump>and the internal combustion engine 10, the radiator including a header, a tank, and a core. The coolant is heat-exchanged with outside air by operation of a cooling fan 13.

Here, reference numeral 14 denotes a cooling module.

In the case of the internal combustion engine radiator, the sizes of the header and tank are large, and thus a radiator having a thickness of 50 mm and a width of 47 mm is required to form the cooling module.

Meanwhile, in order to meet pedestrian safety regulations and testing criteria of the Research Council for Automobile Repairs (RCAR), which is an international organization that works towards reducing insurance costs by improving automotive damageability, it is necessary to reduce the size of the cooling module. However, it is impossible to reduce the thickness of the conventional radiator due to the structures of the header and tank, and if the size of the cooling module is reduced, it is difficult to ensure the cooling efficiency.

Moreover, a turbocharger intercooler radiator has the same problem as the internal combustion engine.

FIG. 4 is a schematic diagram showing a cooling system of a vehicle automatic transmission.

As shown in FIG. 4, an automatic transmission 21 disposed on one side of an internal combustion engine 10 has a cooling system in which a liquid oil is circulated between the automatic transmission 21 and a water cooling type automatic transmission oil cooler 22 mounted in an internal combustion engine radiator 11 to perform heat exchange.

During cold start, the automatic transmission oil and the coolant in the radiator 11 are over-cooled to the same temperature as the outside air.

During operation of the vehicle, the automatic transmission oil is moved to the water cooling type automatic transmission oil cooler 22 in the radiator 11 by the drive force of a converter of the automatic transmission 21 and heat-exchanged with the coolant in the radiator 11.

During cold start, the coolant in the radiator 11 is over-cooled and the automatic transmission oil is kept at the cooled state until heated coolant in the engine is introduced into the radiator 11 and heat-exchanged with the automatic transmission oil by operation of a thermostat.

When the automatic transmission oil is over-cooled, the oil viscosity is increased, and thus a larger drive force is required, which is very disadvantageous in view of fuel efficiency.

That is, the fuel efficiency of the automatic transmission at low temperature is lower than that at high temperature at which the oil viscosity is reduced.

To solve the above-described problems, research aimed at improving fuel efficiency by increasing the oil temperature at low temperature using a separate device that heats the oil has continues to progress.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to solve the above-described problems associated with the prior systems. Accordingly, the present invention provides a new type of evaporation cycle heat exchange system for a vehicle, in which an evaporative heat exchanger using the principle that a working fluid is easily evaporated as its boiling point is lowered at low pressure and the evaporated fluid is moved by a pressure difference caused by volume expansion and capillary phenomenon is employed to cool coolant circulating through a vehicle cooling system. Accordingly, it is possible to improve the cooling efficiency of the entire cooling system, reduce the size of components to comply with pedestrian protection regulations, improve fuel efficiency, and ensure the stability of the system.

Moreover, the present invention provides an evaporation cycle heat exchange system for a vehicle, in which a product-integrated or line-integrated evaporative heat exchanger capable of being mounted in various vehicle components such as an inverter, a fuel cell stack, an oil fan of an internal combustion engine, a turbocharger, an automatic transmission oil fan, etc. is employed. Accordingly, it is possible to easily apply the evaporative heat exchanger to various vehicle components and various vehicle models, and thus it is possible to increase the degree of freedom of the design of the cooling system.

In one aspect, the present invention provides an evaporation cycle heat exchange system for a vehicle, the system including an evaporative heat exchanger including an evaporative heat exchange unit, a condensing heat exchange unit, and a pipe line provided between both the heat exchange units to circulate a working fluid and performing heat exchange in such a manner that the working fluid is easily evaporated as its boiling point is lowered at low pressure and the working fluid at one side is moved to the other side by a pressure difference caused by volume expansion and capillary phenomenon.

The evaporative heat exchange unit of the evaporative heat exchanger may be integrally mounted in an inverter, which forms an electronic component coolant circulation line for a hybrid vehicle, to perform heat exchange with coolant, the coolant circulation line extending through the inverter, a reservoir, an integrated starter/generator, a water pump, and the inverter.

The evaporative heat exchange unit of the evaporative heat exchanger may be connected to an electronic component coolant circulation line for a hybrid vehicle to perform heat exchange with coolant, the coolant circulation line extending through an inverter, a reservoir, an integrated starter/generator, a water pump, and the inverter.

The evaporative heat exchange unit of the evaporative heat exchanger may be integrally mounted in a fuel cell stack, which forms a fuel cell stack coolant circulation line for a fuel cell vehicle, to perform heat exchange with coolant, the coolant circulation line extending through the fuel cell stack, a reservoir, a water pump, and the fuel cell stack.

The evaporative heat exchange unit of the evaporative heat exchanger may be connected to a fuel cell stack coolant circulation line for a fuel cell vehicle to perform heat exchange with coolant, the coolant circulation line extending through a fuel cell stack, a reservoir, a water pump, and the fuel cell stack.

The evaporative heat exchange unit of the evaporative heat exchanger may be integrally mounted in an internal combustion engine, which forms an internal combustion engine coolant circulation line for a fuel cell vehicle, to perform heat exchange with coolant, the coolant circulation line extending through the internal combustion engine, a water pump, and the internal combustion engine.

The evaporative heat exchange unit of the evaporative heat exchanger may be connected to an internal combustion engine coolant circulation line for a fuel cell vehicle to perform heat exchange with coolant, the coolant circulation line extending through the internal combustion engine, a water pump, and the internal combustion engine.

The evaporative heat exchange unit of the evaporative heat exchanger may be integrally mounted in an oil fan of a vehicle automatic transmission to perform heat exchange with oil.

The evaporative heat exchange unit of the evaporative heat exchange may be connected a specific region of an oil circulation line of a vehicle automatic transmission and, at the same time, mounted in a housing, through which oil flowing through the circulation line can pass, to perform heat exchange with the oil passing through the housing.

The evaporative heat exchange unit of the evaporative heat exchanger may be integrally mounted in a turbocharger, which forms a turbocharger exhaust gas circulation line, to perform heat exchange with exhaust gas, the exhaust gas circulation line extending through the turbocharger, an inlet, an engine, an outlet, and the turbocharger, and wherein the evaporative heat exchange unit of the evaporative heat exchanger may be connected to a turbocharger exhaust gas circulation line to perform heat exchange with exhaust gas, the exhaust gas circulation line extending through the turbocharger, an inlet, an engine, an outlet, and the turbocharger.

Other aspects and various embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
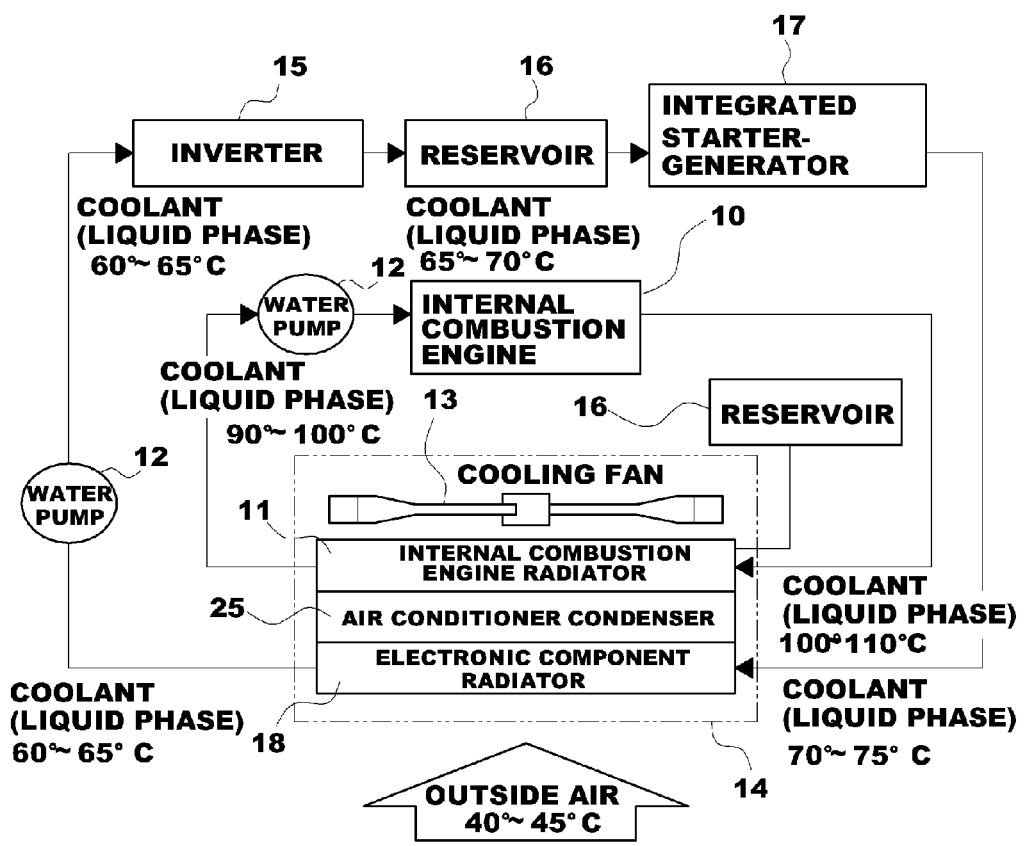
FIG. 1 is a schematic diagram showing a cooling system of a hybrid vehicle.
Figure 2:
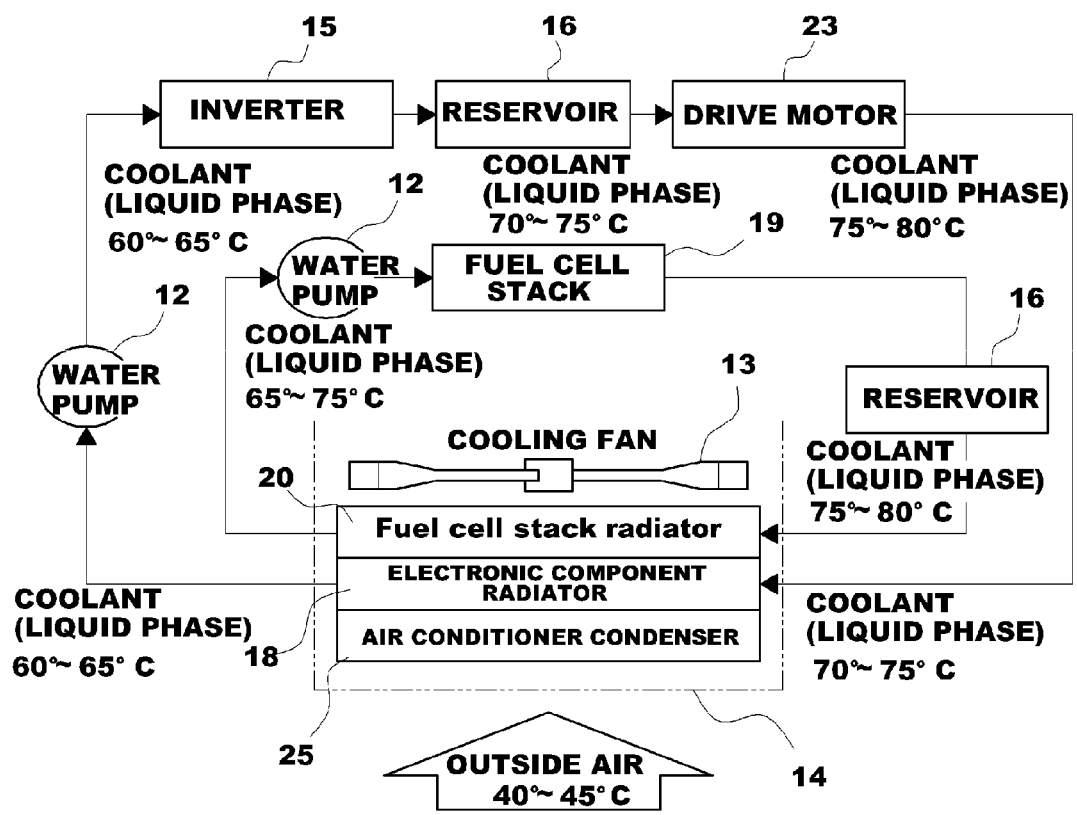
FIG. 2 is a schematic diagram showing a cooling system of a fuel cell vehicle.
Figure 3:
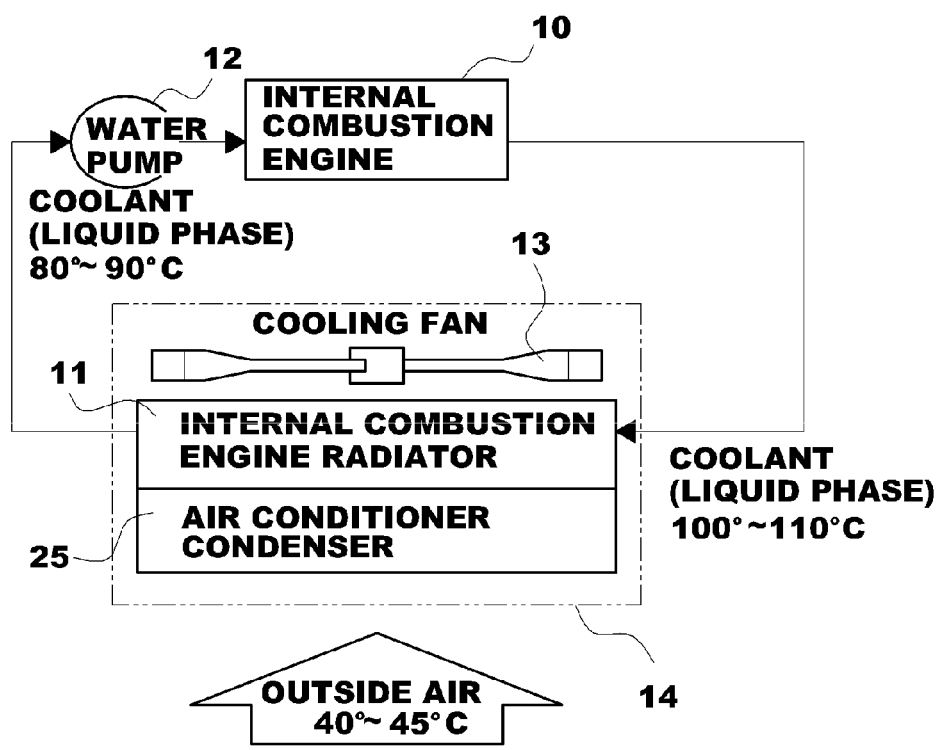
FIG. 3 is a schematic diagram showing a cooling system of an internal combustion engine vehicle.
Figure 4:
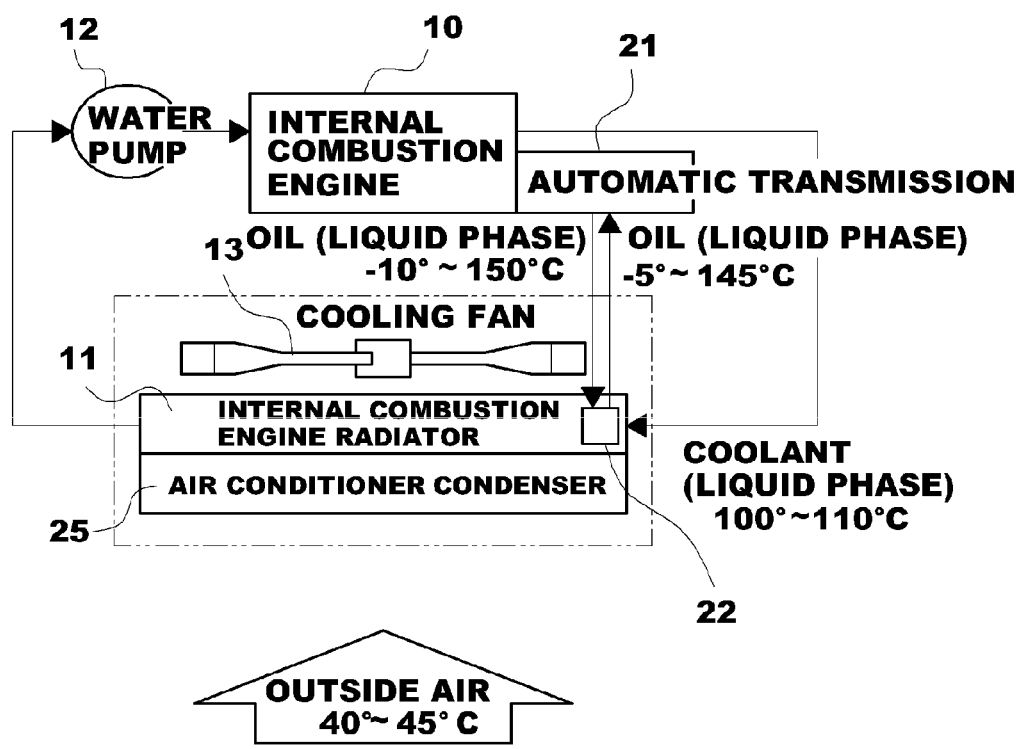
FIG. 4 is a schematic diagram showing a cooling system of a vehicle automatic transmission.
Figure 5:
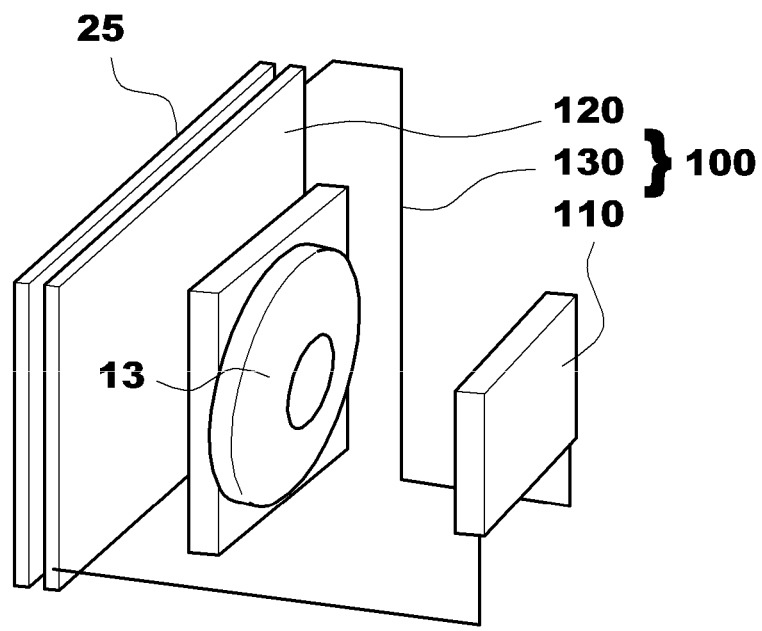
FIG. 5 is a schematic diagram showing an exemplary evaporative heat exchanger employed in an evaporation cycle heat exchange system for a vehicle in accordance with the present invention.

FIG. 5 is a schematic diagram showing an evaporative heat exchanger employed in an evaporation cycle heat exchange system for a vehicle in accordance with various embodiments of the present invention.

As shown in FIG. 5, the evaporative heat exchanger 100 has a structure in which a pipe line 130 connects an evaporative heat exchange unit 110 to a condensing heat exchange unit 120 such that a working fluid is repeatedly circulated therethrough.

For example, the condensing heat exchange unit 120 may be disposed between an air conditioner condenser 25 and a cooling fan 13.

Moreover, one row of the two-row pipe line 130 disposed between the evaporative heat-exchange unit 110 and the condensing heat-exchange unit 120 is a line through which a gaseous fluid is discharged from the evaporative heat exchange unit 110, and the other row is a line through which a liquid fluid is fed into the evaporative heat exchange unit 110.

The working fluid circulating through the evaporative heat exchanger 100 is present in two phases, and this fluid undergoes phase change based on thermodynamics, hydrodynamics, and heat transfer principles.

When heat is applied to the evaporative heat exchange unit, the heat is transferred by conduction through an outer wall to a liquid-phase working fluid present in the evaporative heat exchange unit.

At this time, the liquid-phase fluid is evaporated on a wick surface, and the vapor region of the evaporative heat exchange unit increase the vapor density and pressure.

As a result, a pressure gradient is formed in a vapor passage in the middle of a vessel of the evaporative heat exchange unit toward the condensing heat exchange unit in which the vapor density and pressure are relatively low, and thus the vapor is transferred.

The vapor is cooled on the inner wall of the condensing heat exchange unit, in which the temperature is relatively low, to dissipate heat and returned to the liquid phase.

The liquid-phase working fluid is returned to the evaporative heat exchange unit by the capillary pressure of the wick or by gravity through pores in the wick.

When the wick is employed, the fluid flows by a capillary tube due to a pressure difference and an improved pumping efficiency by the capillary tube even if a condensing portion is not located higher than an evaporating portion.

When the wick is not employed, it is preferable that the condensing portion be located higher than the evaporating portion, however, one will appreciate that such configuration is not essential to the present invention.

Accordingly, when the wick is applied to the evaporative heat exchange unit, the condensing heat exchange unit, and the pipe line, the working fluid flows from the evaporative heat exchange unit to the condensing heat exchange unit through the pipe line due to a pumping action by the capillary pressure and a pressure difference between the liquid phase and the gaseous phase and is returned to the evaporative heat exchange unit, which is repeatedly performed, thus performing the heat exchange.

The above-described evaporative heat exchanger 100 can be effectively applied to an electronic component cooling system, an internal combustion engine cooling system, a turbocharger intercooler cooling system, and an automatic transmission cooling system.

First, an example in which the evaporative heat exchanger according to the present invention is applied to the electronic component cooling system will be described below.

Since the efficiency of the electronic component system is significantly deteriorated due to the properties of semiconductors used in electronic components when the temperature rises, a technique for cooling the electronic components such as an inverter, a fuel cell stack, etc. to below 80° C. is required to improve the efficiency of the system.

The temperature of 80° C. is significantly lower than the cooling temperature of 115° C. in an internal combustion engine for a vehicle.

When a coolant is heat-exchanged with outside air of 45° C., the temperature difference in the electronic component system is lower than that of the existing internal combustion engine, and thus the cooling efficiency may be reduced.

Accordingly, in order to prevent deterioration in the cooling efficiency of the electronic component heat exchanger, it is necessary to increase the size of the heat exchanger and the capacity of the cooling fan.

For this purpose, the present invention provides a cooling system in which an evaporative heat exchanger using the principle that the working fluid is easily evaporated as its boiling point is lowered at low pressure and the evaporated fluid is moved by a pressure difference caused by volume expansion and capillary phenomenon is integrally mounted in each of the electronic components such as an inverter, a fuel cell stack, etc., or connected to a coolant circulation line covering these components such that the coolant circulating through the electronic component system absorbs a large amount of heat generated from the electronic components and then the absorbed heat is radiated in a condensing heat exchange unit located in front or rear of an engine cooling fan to forcibly cool the heat by cooling wind or naturally cool the heat by traveling wind introduced through a grill.

Accordingly, it is possible to improve the cooling efficiency in a cooling system in which the temperature difference between the fluids to be heat-exchanged is small using evaporation and condensation latent heat having a high specific heat compared to the existing sensible heat.

Next, an example in which the evaporative heat exchanger according to the present invention is applied to the internal combustion engine cooling system will be described below.

Figure 13:
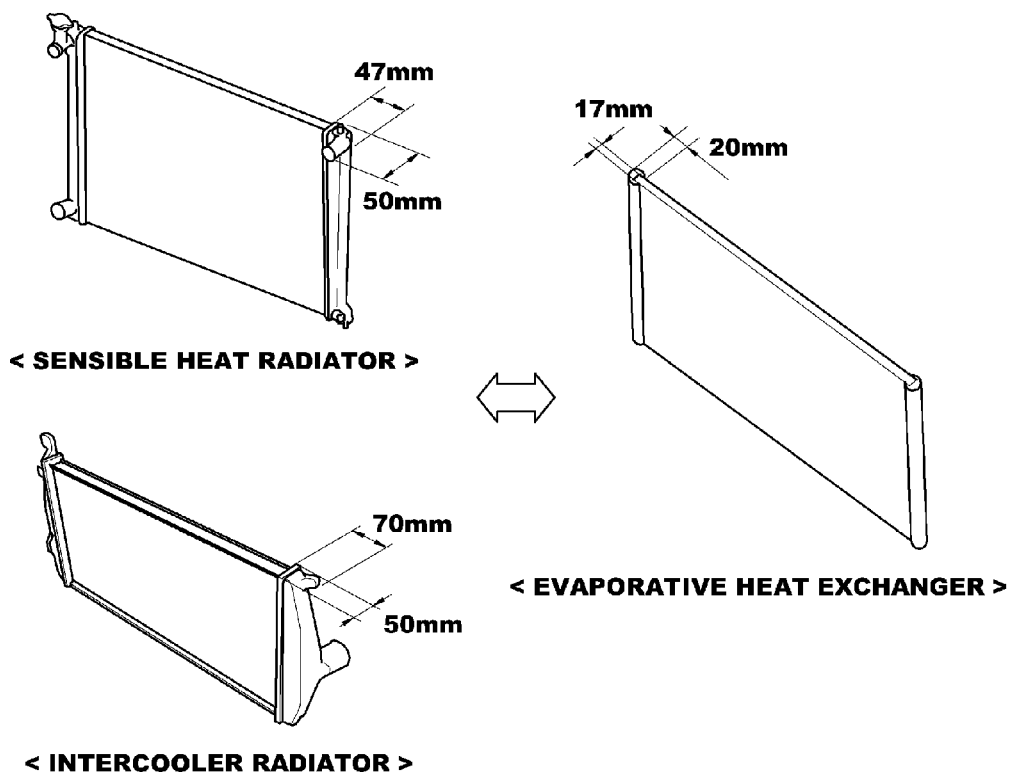
FIG. 13 is a schematic diagram comparing the sizes of an exemplary radiator of the present invention and a conventional radiator.

When the evaporative heat exchanger is applied to the internal combustion engine cooling system, it is possible to reduce the size of the system and change the shape of the heat exchanger from the shape of a radiator to the shape of a condenser due to an improvement in cooling efficiency by the use of latent heat (see FIG. 13).

Moreover, it is possible to significantly reduce the size of the radiator by eliminating the tank (having a size of 40 to 50 mm) and reduce the size of the header (to 20 to 30 mm).

In view of European pedestrian protection regulations and testing criteria of the Research Council for Automobile Repairs (RCAR), when the size of the heat exchanger is significantly reduced, it is possible to reduce the insurance rate. For example, in the case of a sport utility vehicle (SUV), when the insurance rate is reduced by one level, an insurance fee of about 220,000 KRW is saved per year, and thus it is advantageous to comply with the related regulations and the value of commodities is increased when the cooling system using the evaporative heat exchanger is employed.

Next, an example in which the evaporative heat exchanger according to the present invention is applied to the automatic transmission cooling system will be described below.

In the automatic transmission oil cooling system, a technique for improving fuel efficiency by appropriately maintaining the viscosity of oil is required.

During driving of a vehicle, automatic transmission oil continuously flows in a water cooling type automatic transmission oil cooler of the radiator to be over-cooled at low temperature, thus reducing the fuel efficiency.

Accordingly, it is necessary to reduce the viscosity of oil at low temperature by rapidly increasing the temperature and cool the oil at high temperature to protect the automatic transmission system and prevent acidification of oil.

In the case where the evaporative heat exchanger is applied to the automatic transmission oil cooling system, when the working fluid of the evaporative heat exchanger is to be evaporated at an appropriate temperature (e.g., about 100° C.), the working fluid is not evaporated below the oil temperature of 100° C., and thus the working fluid is not circulated by the pressure difference and the cooling operation is not performed.

As a result, the oil temperature is rapidly increased, which results in an improvement in fuel efficiency.

However, a pressure difference is generated at an oil temperature of more than 100° C. by the evaporation of the working fluid, and thus the working fluid is cooled.

As a result, the working fluid does not flow at low temperature, and the fuel efficiency is improved at low and middle temperature by the use of latent heat.

Next, an example in which the evaporative heat exchanger according to the present invention is applied to the turbocharger intercooler cooling system will be described below The effects of the evaporative heat exchanger applied to the internal combustion engine cooling system can also be obtained when the evaporative heat exchanger is applied to the turbocharger intercooler heat exchanger consisting of a header and a tank.

That is, due to an improvement in cooling efficiency by the use of latent heat, it is possible to reduce the size of the system and change the shape of the heat exchanger from the shape of an intercooler radiator to the shape of a condenser (See FIG. 13).

For example, it is possible to significantly reduce the size of the intercooler radiator by eliminating the tank (having a size of 40 to 50 mm) and reduce the size of the header (to 20 to 30 mm).

Like the internal combustion engine cooling system, in view of European pedestrian protection regulations and testing criteria of the Research Council for Automobile Repairs (RCAR), when the size of the heat exchanger is significantly reduced, it is possible to reduce the insurance rate. For example, in the case of a sport utility vehicle (SUV), when the insurance rate is reduced by one level, an insurance fee of about 220,000 KRW is saved per year, and thus it is advantageous to comply with the related regulations and the value of commodities is increased when the cooling system using the evaporative heat exchanger is employed.

The above-described evaporative heat exchanger 100 may be mounted integrally with each of the electronic components such as an inverter, a fuel cell stack, etc. (product-integrated evaporative heat exchanger) or connected to a specific region of a coolant line (line-integrated evaporative heat exchanger).

Figure 6:
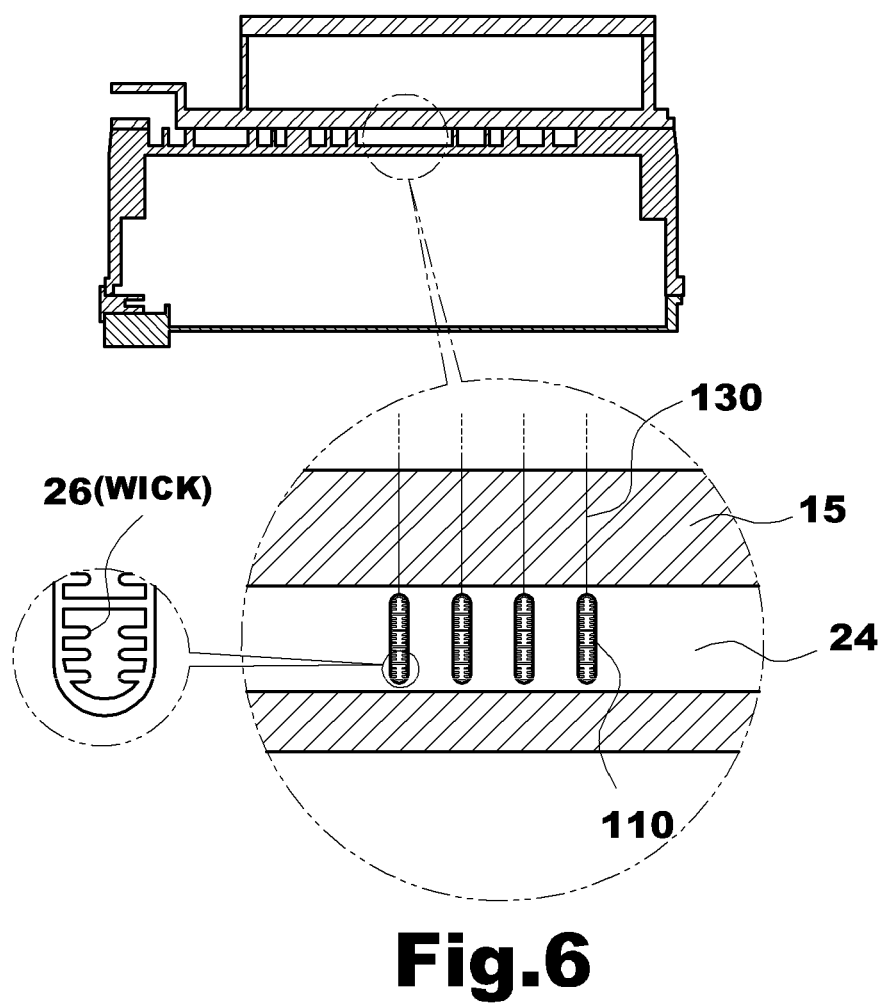
FIG. 6 is a cross-sectional view showing an installation state of an exemplary product-integrated evaporative heat exchanger employed in the evaporation cycle heat exchange system for a vehicle in accordance with the present invention.

As an example, FIG. 6 shows an example in which a product-integrated evaporative heat exchanger is applied to an inverter 15, which is an electronic component of a hybrid vehicle.

In the inverter 15, a water jacket, i.e., a coolant flow field 24 is provided to cool heat generated at the top and bottom thereof during conversion from AC to DC or during pressure reduction, and an evaporative heat exchange unit 110 is provided in the coolant flow field 24 trough which coolant flows.

At least one evaporative heat exchange unit 110 may be arranged in parallel in the coolant flow field 24.

Of course, the evaporative heat exchange unit 110 may form a circulation line with the condensing heat exchange unit 120 and the pipe line 130 such that the working fluid is continuously circulated through the circulation line to perform heat exchange with the coolant.

Figure 7:
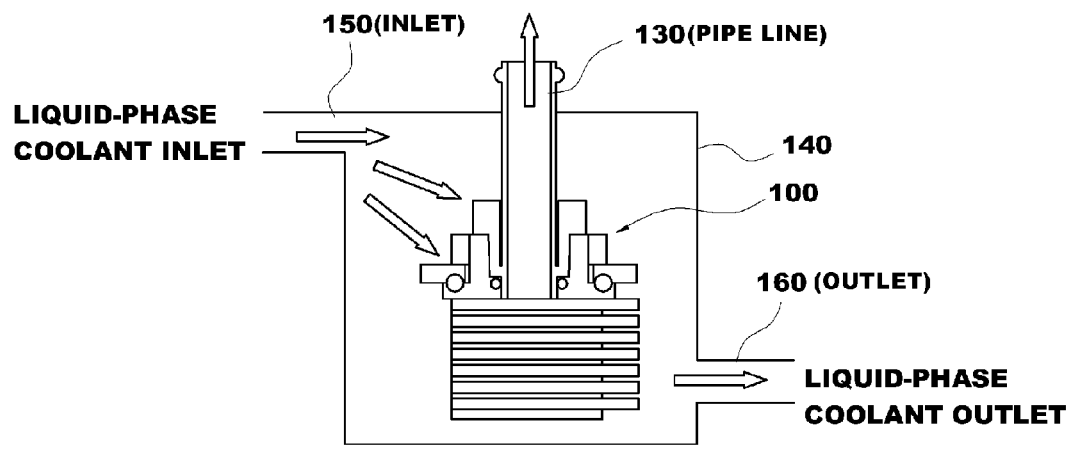
FIG. 7 is a cross-sectional view showing an installation state of an exemplary line-integrated evaporative heat exchanger employed in the evaporation cycle heat exchange system for a vehicle in accordance with the present invention.

As another example, FIG. 7 shows an example in which a line-integrated evaporative heat exchanger is applied to a coolant circulation line covering a fuel cell, an internal combustion engine, etc.

For this purpose, a housing 140 in which the evaporative heat exchange unit 110 is mounted is provided, and an inlet 150 and an outlet 160 of the housing are connected to the coolant circulation line.

Accordingly, high temperature coolant fed into the housing 140 through the inlet 150 is cooled by heat exchange with the evaporative heat exchange unit 110, and the cooled coolant is discharged through the outlet 160, which is repeatedly performed, thus cooling the coolant flowing through the coolant circulation line.

Of course, the evaporative heat exchange unit 110 may also form a circulation line with the condensing heat exchange unit 120 and the pipe line 130, through which the working fluid is circulated.

Here, as another example of the line-integrated evaporative heat exchanger, the evaporative heat exchanger may be applied to an oil circulation line, an exhaust gas circulation line, etc.

Various embodiments in which the evaporative heat exchanger according to the present invention is applied will be described in detail below.

Figure 8A:
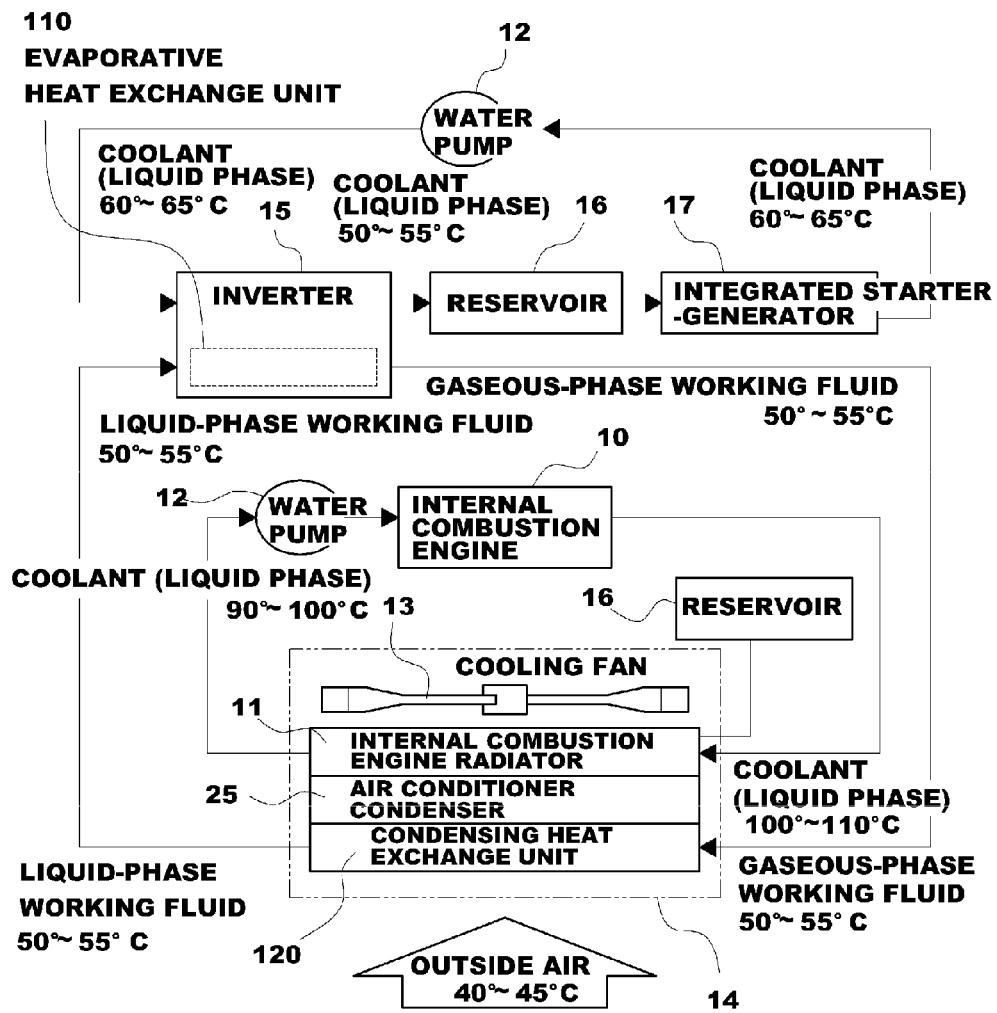
FIGS. 8A and 8B are schematic diagrams showing an exemplary evaporation cycle heat exchange system for a hybrid vehicle in accordance with the present invention.
Figure 8B:
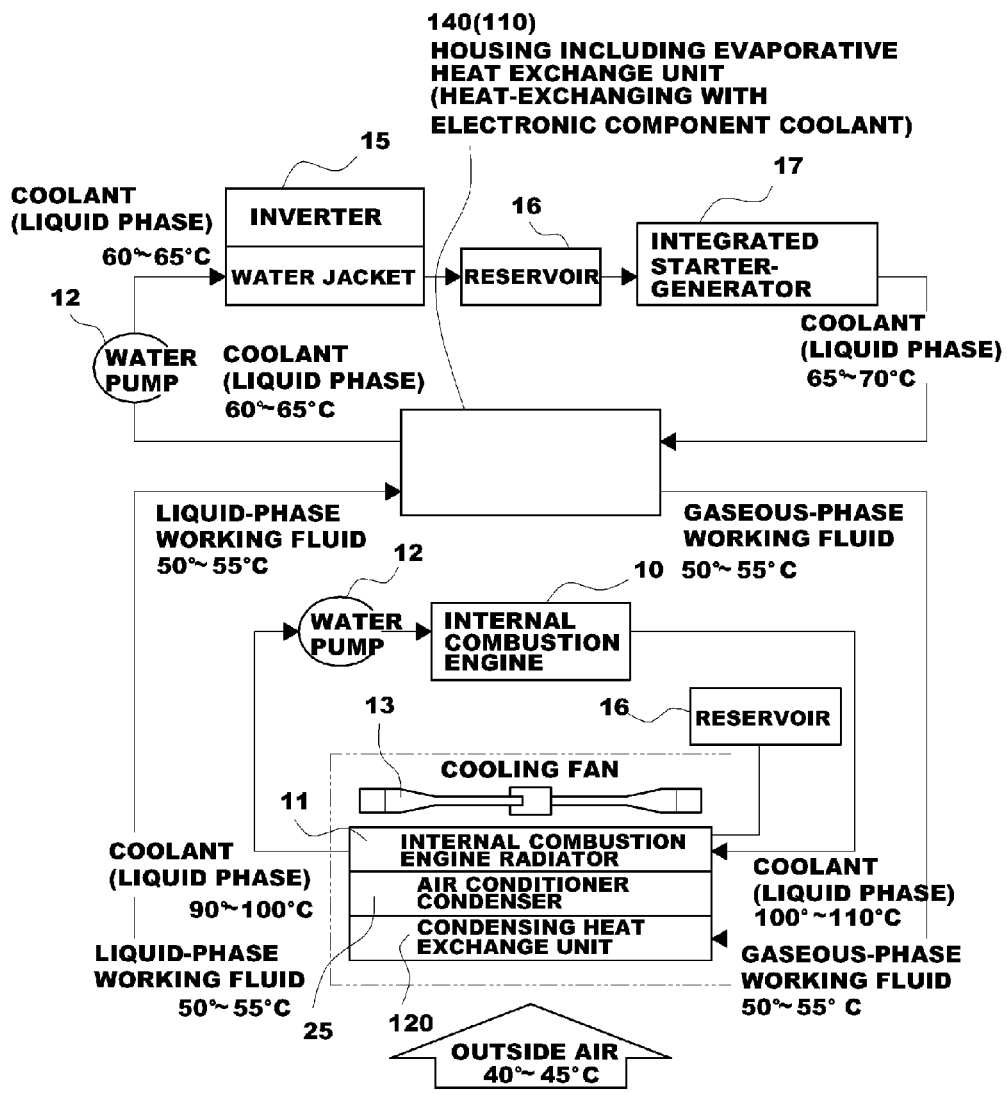

FIGS. 8A and 8B are schematic diagrams showing an evaporation cycle heat exchange system for a hybrid vehicle in accordance with various embodiments of the present invention.

FIG. 8A shows an example of a cooling system for a hybrid vehicle configured using a product-integrated evaporative heat exchanger.

First, in an internal combustion engine cooling system, fluid is circulated through an internal combustion engine 10>an internal combustion engine radiator 11>and a water pump 12. In an electronic component cooling system, fluid is circulated through an inverter 15>a reservoir 16>an integrated starter-generator 17>and a water pump 12.

In this case, in an evaporative heat exchanger, a working fluid is circulated through an inverter-integrated evaporative heat exchange unit 110>a pipe line 130>a condensing heat exchange unit 120+a cooling fan 13>and the pipe line 130.

Accordingly, in the case of the hybrid vehicle, the evaporative heat exchange unit of the evaporative heat exchanger is integrally mounted in the inverter 15 in the electronic component coolant circulation line connected through the inverter>the reservoir>the integrated starter/generator>the water pump>and the inverter to perform heat exchange with coolant.

Here, the condensing heat exchange unit 120 of the evaporative heat exchanger 100 may be located in front of an air conditioner condenser 25 provided in a cooling module 14, located in parallel with the air conditioner condenser 25, or integrally formed with the air conditioner condenser 25 to improve the cooling efficiency.

Especially, it is preferable that a wick 26 be provided inside the pipe line 130 of the evaporative heat exchanger 100 such that the fluid flows by the capillary pressure regardless of the influence of gravity field, however, one will appreciate that such configuration is not essential to the present invention.

FIG. 8B shows an example of a cooling system for a hybrid vehicle configured using a line-integrated evaporative heat exchanger.

First, in an internal combustion engine cooling system, fluid is circulated through an internal combustion engine 10>an internal combustion engine radiator 11>and a water pump 12. In an electronic component cooling system, fluid is circulated through an inverter 15>a reservoir 16>an integrated starter-generator 17>a housing 140 in which an evaporative heat exchange unit 110 is mounted>and a water pump 12.

In this case, in an evaporative heat exchanger, a working fluid is circulated through the housing 140 in which the evaporative heat exchange unit 110 is mounted 110>a pipe line 130>a condensing heat exchange unit 120+a cooling fan 13>and the pipe line 130.

Accordingly, in the case of the hybrid vehicle, the evaporative heat exchanger is mounted integrally with a circulation line in the electronic component coolant circulation line connected through the inverter>the reservoir>the integrated starter/generator>the water pump>and the inverter to perform heat exchange with coolant.

Here, the condensing heat exchange unit 120 of the evaporative heat exchanger 100 may be located in front or rear of the air conditioner condenser 25 provided in the cooling module 14 located in parallel with the air conditioner condenser 25, or integrally formed with the air conditioner condenser 25 to improve the cooling efficiency.

Especially, it is preferable that a wick 26 be provided inside the pipe line 130 of the evaporative heat exchanger 100 such that the fluid flows by the capillary pressure regardless of the influence of gravity field, however, one will appreciate that such configuration is not essential to the present invention.

Moreover, in order to improve the stability of the system by reducing the size of the pipe line, the evaporative heat exchange unit 110 in the housing 140 may be arranged in parallel with the condensing heat exchange unit 120 or an internal combustion engine radiator 11, or the evaporative heat exchange unit 110 in the housing 140 and the condensing heat exchange unit 120 may be integrated with each other.

Figure 9A:
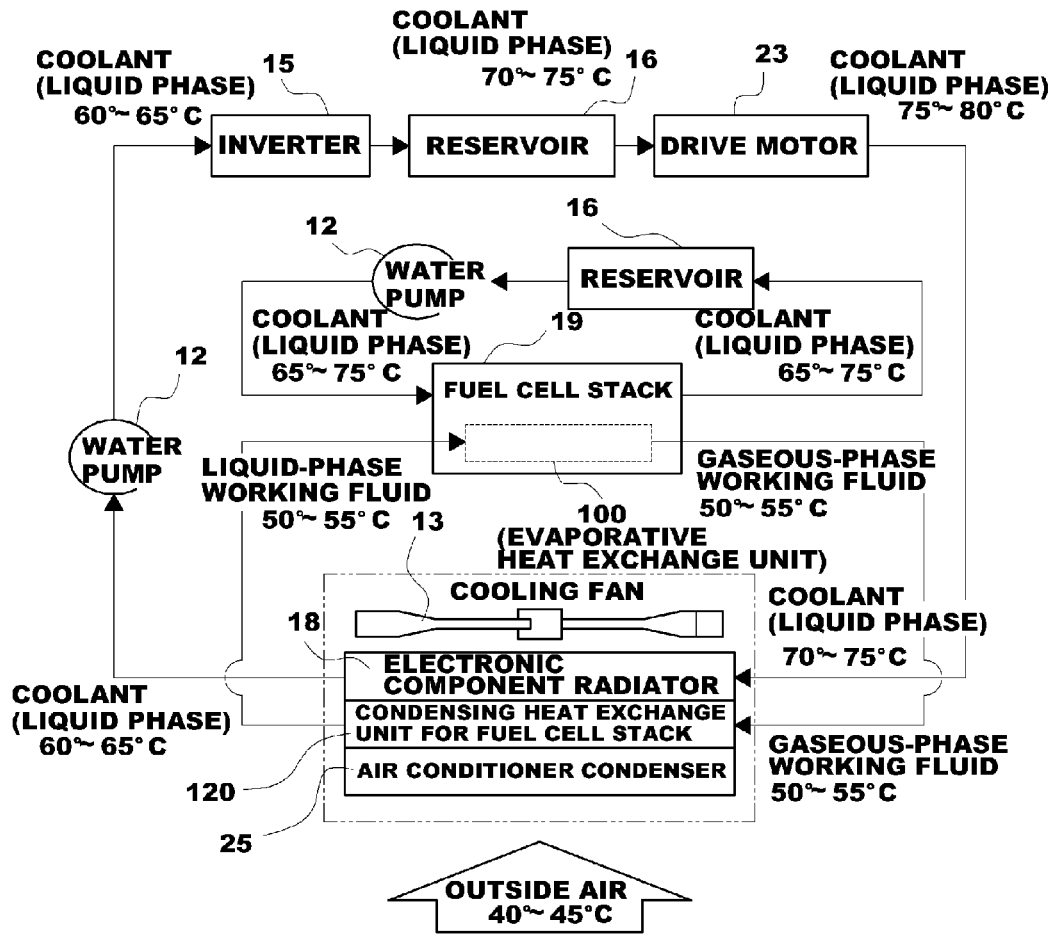
FIGS. 9A and 9B are schematic diagrams showing an exemplary evaporation cycle heat exchange system for a fuel cell vehicle in accordance with the present invention.
Figure 9B:
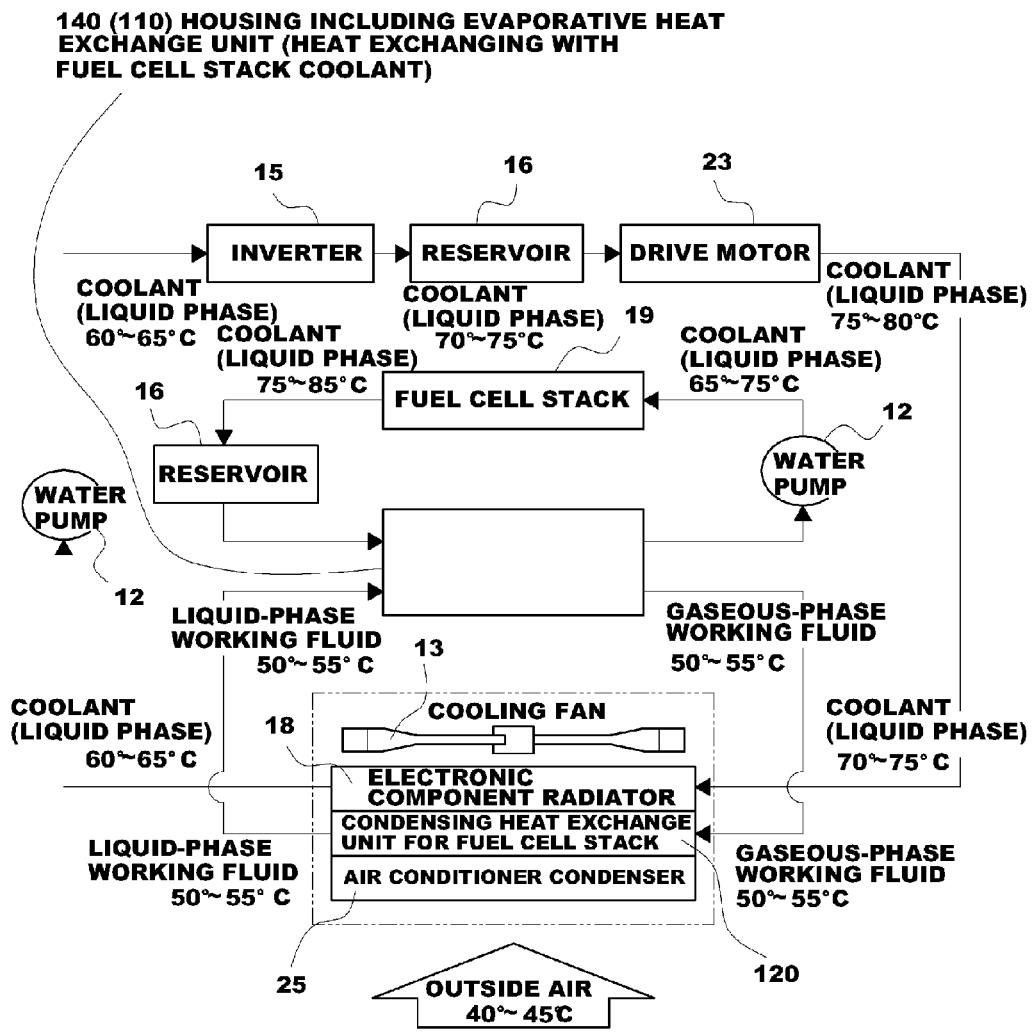

FIGS. 9A and 9B are schematic diagrams showing an evaporation cycle heat exchange system for a fuel cell vehicle in accordance with various embodiments of the present invention.

FIG. 9A shows an example of a cooling system for a fuel cell vehicle configured using a product-integrated evaporative heat exchanger.

First, in a fuel cell stack cooling system, fluid is circulated through a fuel cell stack 19>a reservoir 16>and a water pump 12. In an electronic component cooling system, fluid is circulated through an inverter 15>a reservoir 16>a drive motor 23>an electronic component radiator 18>and a water pump 12.

In this case, in an evaporative heat exchanger, a working fluid is circulated through a stack-integrated evaporative heat exchange unit 100>a pipe line 130>a condensing heat exchange unit 120+a cooling fan 13>and the pipe line 130.

Accordingly, in the case of the fuel cell vehicle, the evaporative heat exchange unit of the evaporative heat exchanger is integrally mounted in the fuel cell stack in the fuel cell stack coolant circulation line connected through the fuel cell stack>the reservoir>the water pump>and the fuel cell stack to perform heat exchange with coolant.

Here, the condensing heat exchange unit 120 of the evaporative heat exchanger 100 may be located in front of an air conditioner condenser 25 provided in a cooling module 14, located in parallel with an electronic component radiator 18, or located in front of the electronic component radiator 18 to improve the cooling efficiency.

Especially, it is preferable that a wick 26 be provided inside the pipe line 130 of the evaporative heat exchanger 100 such that the fluid flows by the capillary pressure regardless of the influence of gravity field, however, one will appreciate that such configuration is not essential to the present invention.

Moreover, it is preferable that the condensing heat exchange unit 120 and the air conditioner condenser 25 be integrated with each other to simplify the structure, however, one will appreciate that such configuration is not essential to the present invention.

FIG. 9B shows an example of a cooling system for a fuel cell vehicle configured using a line-integrated evaporative heat exchanger.

First, in a fuel cell stack cooling system, fluid is circulated through a fuel cell stack 19>a reservoir 16>a housing 140 in which an evaporative heat exchange unit 110 is mounted>and a water pump 12. In an electronic component cooling system, fluid is circulated through an inverter 15>a reservoir 16>a drive motor 23>an electronic component radiator 18>and a water pump 12.

In this case, in an evaporative heat exchanger, a working fluid is circulated through the housing 140 in which the evaporative heat exchange unit 110 is mounted 110>a pipe line 130>a condensing heat exchange unit 120+a cooling fan 13>and the pipe line 130.

Accordingly, in the case of the fuel cell vehicle, the evaporative heat exchanger is mounted integrally with a circulation line in the fuel cell stack coolant circulation line connected through the fuel cell stack>the reservoir>the water pump>and the fuel cell stack to perform heat exchange with coolant.

Here, the condensing heat exchange unit 120 of the evaporative heat exchanger 100 may be located in front or rear of an air conditioner condenser 25 provided in a cooling module 14, located in front or rear of the electronic component radiator 18, located in parallel with the electronic component radiator 18 to improve the cooling efficiency, or integrally formed with the air conditioner condenser 25 to simplify the structure.

Especially, it is preferable that a wick 26 be provided inside the pipe line 130 of the evaporative heat exchanger 100 such that the fluid flows by the capillary pressure regardless of the influence of gravity field, however, one will appreciate that such configuration is not essential to the present invention.

Moreover, in order to improve the stability of the system by reducing the size of the pipe line, the evaporative heat exchange unit 110 in the housing 140 may be arranged in parallel with the condensing heat exchange unit 120 or an internal combustion engine radiator 11, or the evaporative heat exchange unit 110 in the housing 140 and the condensing heat exchange unit 120 may be integrated with each other.

The operation principle of the evaporative heat exchanger for cooling the electronic components in the hybrid vehicle and the fuel cell vehicle will be described below.

The evaporation temperature of the working fluid used in the evaporative heat exchanger is set to be lower than the normal temperature range of the electronic component cooling system (e.g., 55° C.).

The liquid-phase fluid in the evaporative heat exchanger absorbs heat from the coolant in the electronic component cooling system, which is above the evaporation temperature (e.g., 60 to 65° C.), and is then evaporated.

During evaporation, heat is absorbed from the electronic component system by latent heat of the working fluid, and thus the electronic component system is cooled.

The pressure of the heated gaseous fluid in the evaporative heat exchanger is increased in a closed space, and thus the working fluid flows toward a condensing portion at one side of the evaporative heat exchanger, in which the pressure is relatively low, due to the increase in pressure In the case where an evaporating portion is located at the bottom and the condensing portion is located at the top, the working fluid can easily flow in the same direction as the gravity field (the gaseous phase is moved up). In the opposite case, the working fluid can be moved in the opposite direction to the gravity field with the use of the wick using the capillary phenomenon.

The working fluid is moved to the condensing heat exchange unit located in front or rear of the cooling fan of the internal combustion engine and forcibly cooling the working fluid by the cooling fan or naturally cooling the working fluid by traveling wind introduced through a grill.

When the working fluid is forcibly cooled, the amount of working fluid circulated in the entire system is increased by an increase in pressure due to an increase in condensation rate, and thus the cooling efficiency is increased.

The working fluid in the condensing heat exchange unit is heat-exchanged with outside air. However, since the temperature (40 to 45° C.) of the outside air is lower than the condensation temperature of about 55° C., the working fluid in the condensing heat exchange unit is condensed into liquid phase.

The above cycle is repeatedly performed.

In the case of an evaporative/condensing heat exchanger using water as the working fluid, although the difference in temperature between outside air (40 to 45° C.) and the working fluid (50 to 55° C.), the amount of evaporative latent heat (539 Kcal/kg° C. is about ten times greater than the amount of sensible heat (55 Kcal/kg° C.), and thus a large amount of heat can be transferred, thus increasing the cooling efficiency.

Here, the specific heat of water at a temperature of 55° C. is 55 Kcal/kg° C., and that of vapor is about 594 Kcal/kg° C. (55+about 539) Kcal/kg° C.

The evaporative/condensing heat exchanger has a thermal conductivity of about 98.5%, which is faster than a thermal conductivity of about 50% that the existing sensible heat exchange has, by vacuum superconducting heat transfer, and the vapor can be moved to the condensing portion at the sound speed.

Figure 10A:
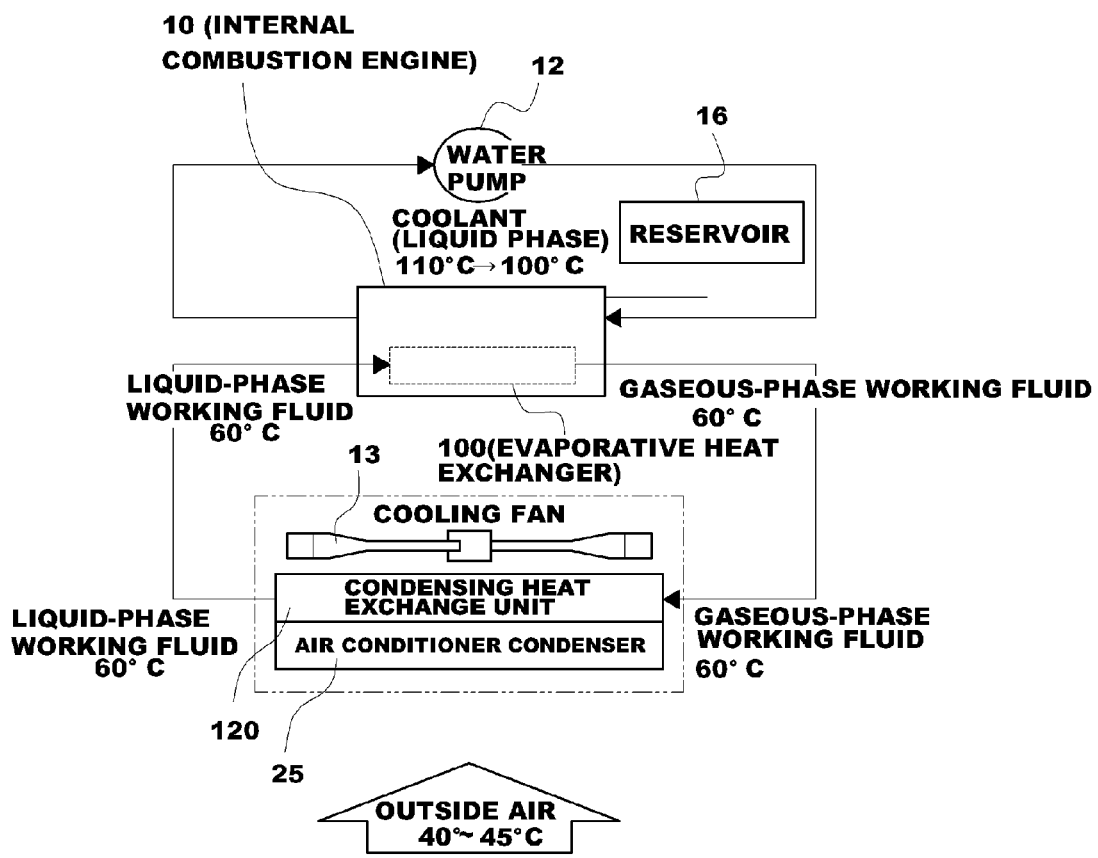
FIGS. 10A and 10B are schematic diagrams showing an exemplary evaporation cycle heat exchange system for an internal combustion engine vehicle in accordance with the present invention.
Figure 10B:
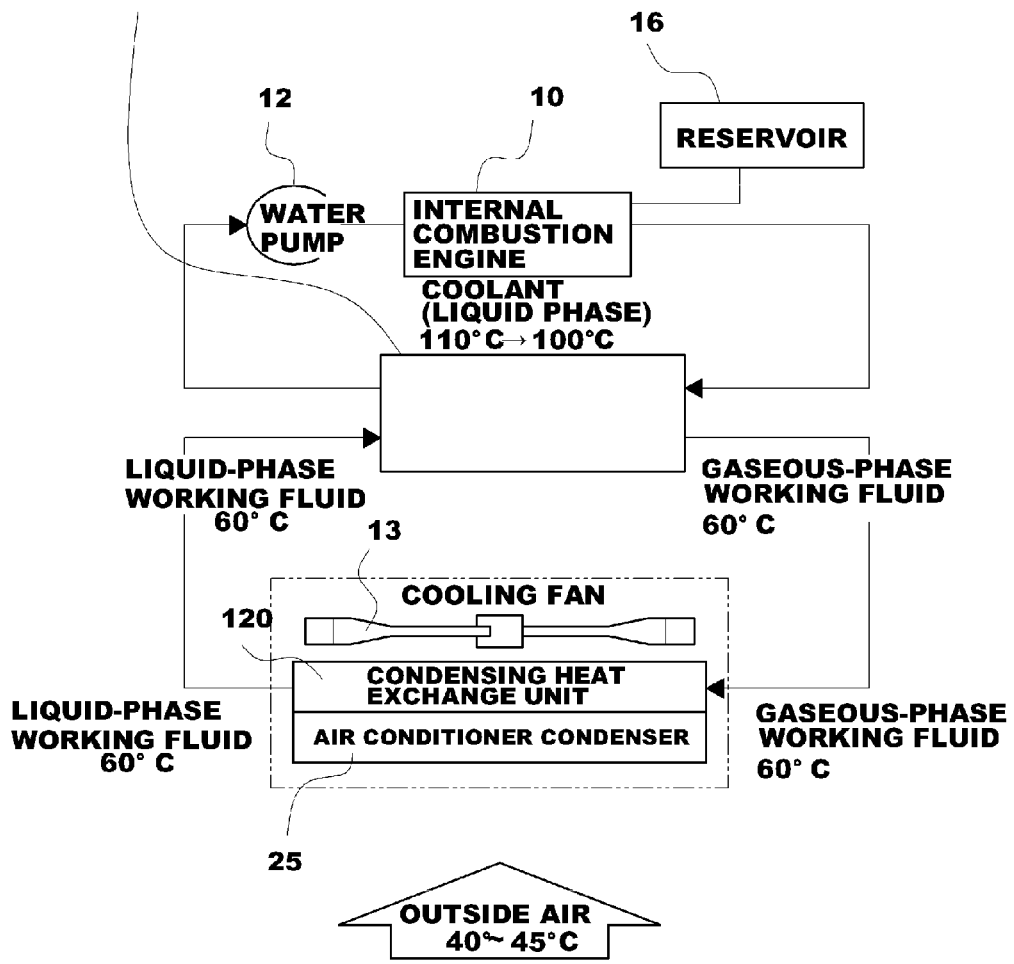

FIGS. 10A and 10B are schematic diagrams showing an evaporation cycle heat exchange system for an internal combustion engine vehicle in accordance with various embodiments of the present invention.

FIG. 10A shows an example of a cooling system for an internal combustion engine vehicle configured using a product-integrated evaporative heat exchanger.

First, in an internal combustion engine cooling system, fluid is circulated through an internal combustion engine 10>a water pump 12>and a water hose.

In this case, in an evaporative heat exchanger, a working fluid is circulated through an internal combustion engine-integrated evaporative heat exchange unit 110>a pipe line 130>a condensing heat exchange unit 120+a cooling fan 13>and the pipe line 130.

Accordingly, in the case of the internal combustion engine vehicle, the evaporative heat exchange unit of the evaporative heat exchanger is integrally mounted in the internal combustion engine, e.g., in an oil fan, in an internal combustion engine coolant circulation line connected through the internal combustion engine>the water pump>the water hose>and the internal combustion engine to perform heat exchange with coolant.

Here, the condensing heat exchange unit 120 of the evaporative heat exchanger 100 may be located in front of an air conditioner condenser 25 provided in a cooling module 14, located in parallel with the air conditioner condenser 25 to improve the cooling efficiency, or integrally formed with the air conditioner condenser 25 to simplify the structure.

Especially, it is preferable that a wick 26 be provided inside the pipe line 130 of the evaporative heat exchanger 100 such that the fluid flows by the capillary pressure regardless of the influence of gravity field, however, one will appreciate that such configuration is not essential to the present invention.

FIG. 10B shows an example of a cooling system for an internal combustion engine vehicle configured using a line-integrated evaporative heat exchanger.

First, in an internal combustion engine cooling system, fluid is circulated through an internal combustion engine 10>a water hose>a housing 140 in which an evaporative heat exchange unit 110 is mounted>and a water pump 12.

In this case, in an evaporative heat exchanger, a working fluid is circulated through the housing 140 in which the evaporative heat exchange unit 110 is mounted 110>a pipe line 130>a condensing heat exchange unit 120+a cooling fan 13>and the pipe line 130.

Accordingly, in the case of the internal combustion engine vehicle, the evaporative heat exchange unit of the evaporative heat exchanger is mounted integrally with a circulation line in the internal combustion engine coolant circulation line connected through the internal combustion engine>the water hose>the housing 140 in which the evaporative heat exchange unit 110 is mounted 110>the water pump>and the internal combustion engine to perform heat exchange with coolant.

Here, the condensing heat exchange unit 120 of the evaporative heat exchanger 100 may be located in parallel with an air conditioner condenser 25 provided in a cooling module 14 to improve the cooling efficiency, or integrally formed with the air conditioner condenser 25 to simplify the structure.

Especially, it is preferable that a wick 26 be provided inside the pipe line 130 of the evaporative heat exchanger 100 such that the fluid flows by the capillary pressure regardless of the influence of gravity field, however, one will appreciate that such configuration is not essential to the present invention.

Moreover, in order to improve the stability of the system by reducing the size of the pipe line, the evaporative heat exchange unit 110 in the housing 140 may be arranged in parallel with the condensing heat exchange unit 120 or integrally formed with the condensing heat exchange unit 120. Furthermore, in order to optimize the cooling performance for each local area, the condensing heat exchange unit 120 may be located in front or rear of the air conditioner condenser 25.

Figure 11A:
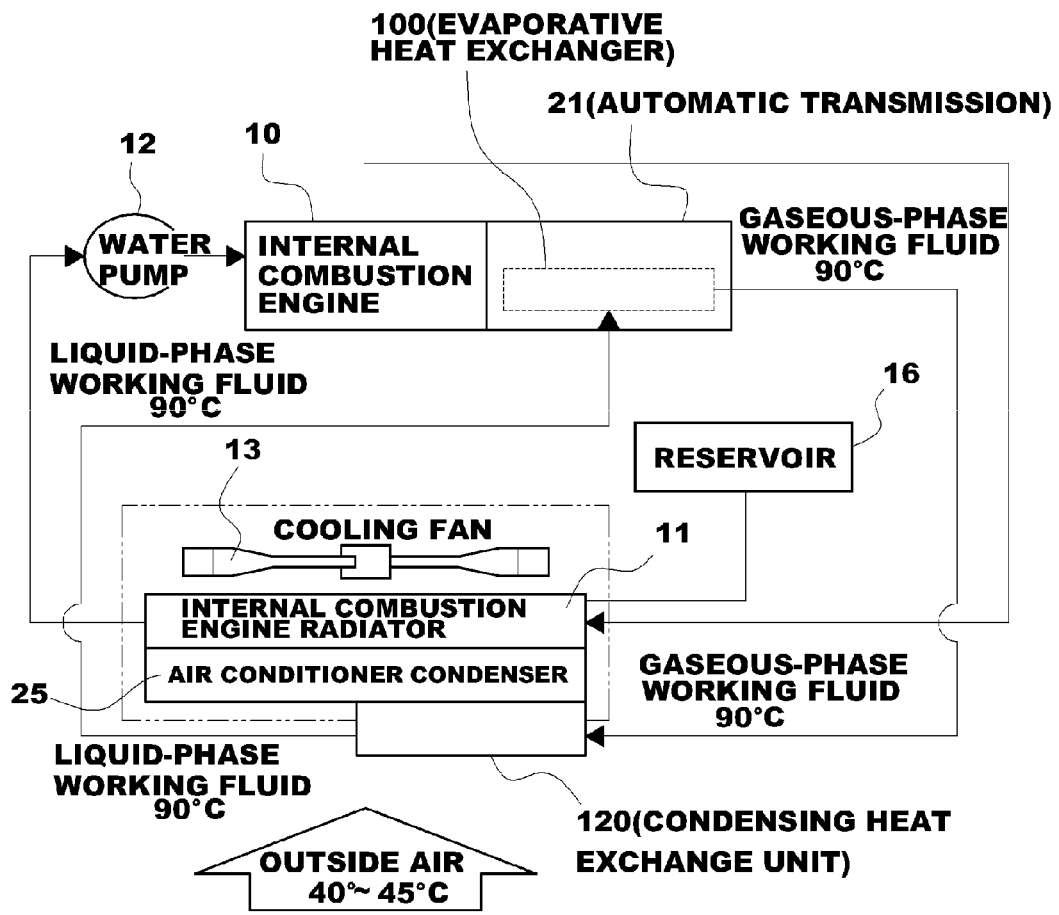
FIGS. 11A and 11B are schematic diagrams showing an exemplary evaporation cycle heat exchange system for a vehicle automatic transmission in accordance with the present invention.
Figure 11B:
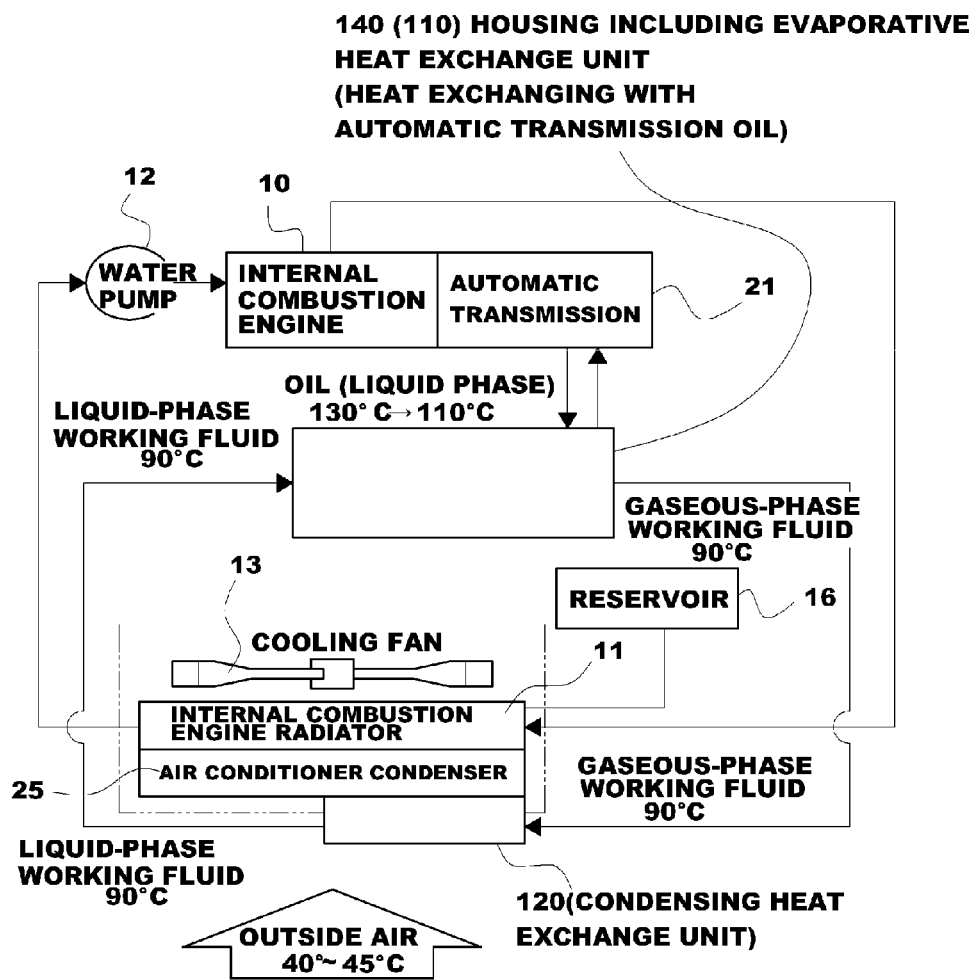

FIGS. 11A and 11B are schematic diagrams showing an evaporation cycle heat exchange system for a vehicle automatic transmission in accordance with various embodiments of the present invention.

FIG. 11A shows an example of a cooling system for an automatic transmission configured using a product-integrated evaporative heat exchanger.

In the cooling system for the automatic transmission, fluid is circulated through an automatic transmission 21>an oil fan>and the automatic transmission 21. In this case, in an evaporative heat exchanger, a working fluid is circulated through an automatic transmission-integrated evaporative heat exchange unit 110>a pipe line 130>a condensing heat exchange unit 120+a cooling fan 13>and the pipe line 130.

Accordingly, in the case of the automatic transmission, the evaporative heat exchange unit of the evaporative heat exchanger is integrally mounted in the automatic transmission, e.g., in the oil fan, in an automatic transmission coolant circulation line connected through the automatic transmission>the oil fan>and the automatic transmission to perform heat exchange with oil.

Here, the condensing heat exchange unit 120 of the evaporative heat exchanger 100 may be located in front of an air conditioner condenser 25 provided in a cooling module 14 or located in parallel with the air conditioner condenser 25 to improve the cooling efficiency, or integrally formed with the air conditioner condenser 25 to simplify the structure.

Especially, it is preferable that a wick 26 be provided inside the pipe line 130 of the evaporative heat exchanger 100 such that the fluid flows by the capillary pressure regardless of the influence of gravity field, however, one will appreciate that such configuration is not essential to the present invention.

FIG. 11*b* shows an example of a cooling system for an automatic transmission configured using a line-integrated evaporative heat exchanger.

In the cooling system for the automatic transmission, fluid is circulated through an automatic transmission 21>an oil fan>a housing 140 in which an evaporative heat exchange unit 110 is mounted>and the automatic transmission 21. In this case, in an evaporative heat exchanger, a working fluid is circulated through the housing 140 in which the evaporative heat exchange unit 110 is mounted 110>a pipe line 130>a condensing heat exchange unit 120+a cooling fan 13>and the pipe line 130.

Accordingly, in the case of the automatic transmission, the evaporative heat exchange unit of the evaporative heat exchanger is mounted integrally with a circulation line in the automatic transmission oil circulation line connected through the automatic transmission>the oil fan>the housing in which an evaporative heat exchange unit is mounted>and the automatic transmission to perform heat exchange with oil.

Here, the condensing heat exchange unit 120 of the evaporative heat exchanger 100 may be located in parallel with an air conditioner condenser 25 provided in a cooling module 14 to improve the cooling efficiency, or integrally formed with the air conditioner condenser 25 to simplify the structure. Furthermore, in order to optimize the cooling performance for each local area, the condensing heat exchange unit 120 may be located in front or rear of the air conditioner condenser 25.

Especially, it is preferable that a wick 26 be provided inside the pipe line 130 of the evaporative heat exchanger 100 such that the fluid flows by the capillary pressure regardless of the influence of gravity field, however, one will appreciate that such configuration is not essential to the present invention.

Moreover, in order to improve the stability of the system by reducing the size of the pipe line, the evaporative heat exchange unit 110 in the housing 140 may be arranged in parallel with the condensing heat exchange unit 120 or integrally formed with the condensing heat exchange unit 120.

Figure 12A:
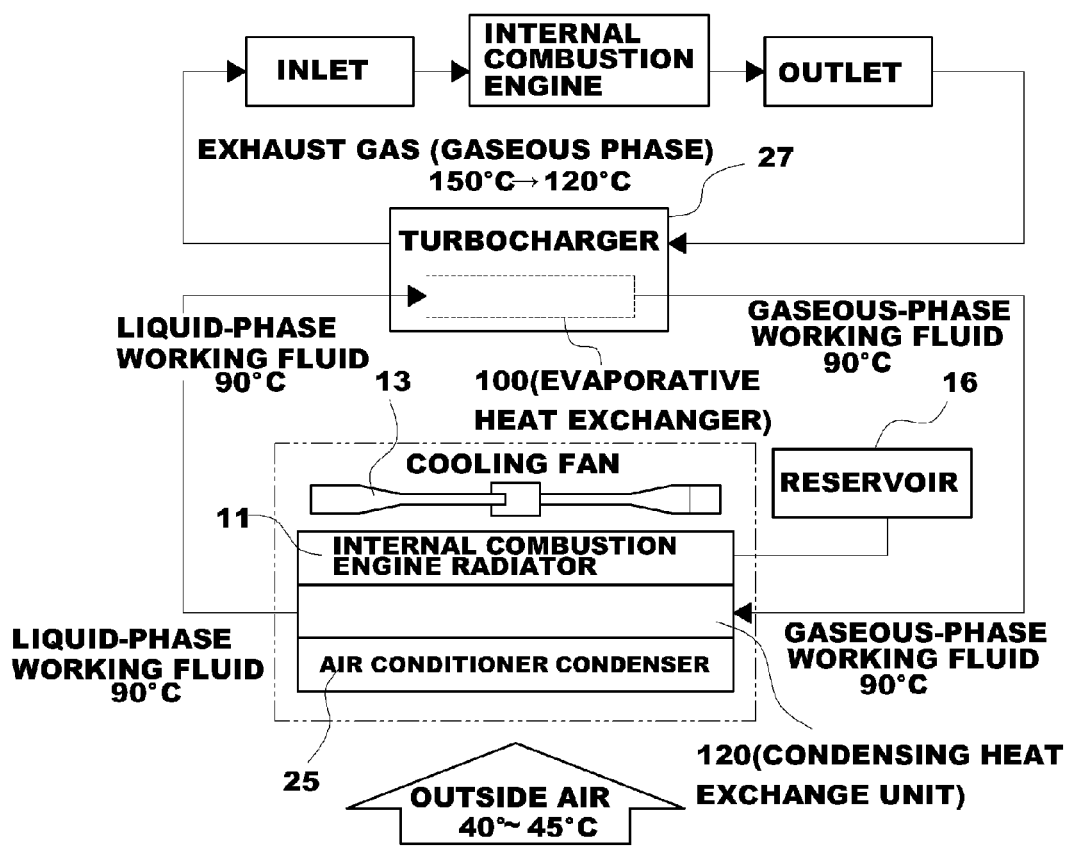
FIGS. 12A and 12B are schematic diagrams showing an exemplary evaporation cycle heat exchange system for a vehicle turbocharger in accordance with the present invention.
Figure 12B:
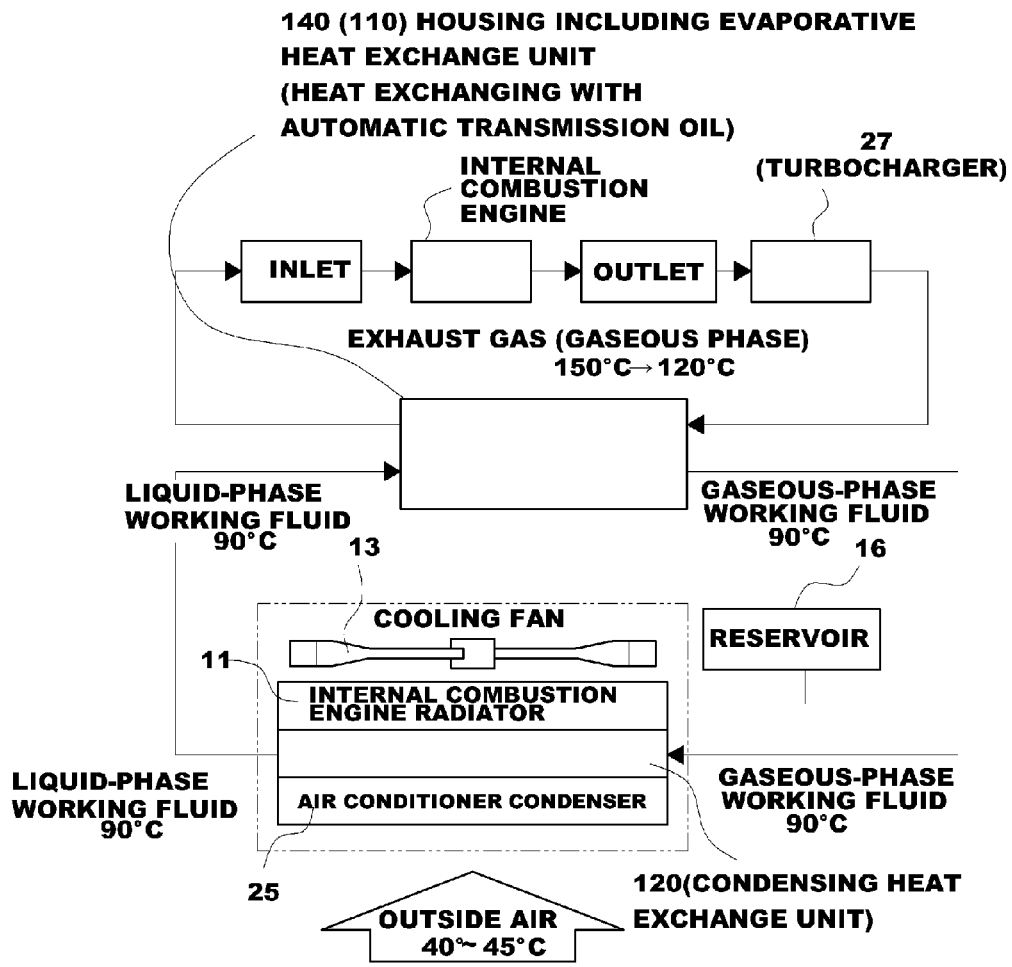

FIGS. 12A and 12B are schematic diagrams showing an evaporation cycle heat exchange system for a vehicle turbocharger in accordance with various embodiments of the present invention.

FIG. 12A shows an example of a cooling system for an internal combustion engine turbocharger configured using a product-integrated evaporative heat exchanger.

In the cooling system for the turbocharger, fluid is circulated through a turbocharger 27>an inlet>an internal combustion engine 10>an outlet>and the turbocharger 27. In this case, in an evaporative heat exchanger, a working fluid is circulated through a turbocharger-integrated evaporative heat exchange unit 110>a pipe line 130>a condensing heat exchange unit 120+a cooling fan 13>and the pipe line 130.

Accordingly, in the case of the turbocharger, the evaporative heat exchange unit of the evaporative heat exchanger is integrally mounted in the turbocharger in the turbocharger exhaust gas circulation line connected through the turbocharger>the inlet>the internal combustion engine>the outlet>and the turbocharger to perform heat exchange with exhaust gas.

Here, the condensing heat exchange unit 120 of the evaporative heat exchanger 100 may be located in front of an internal combustion engine radiator 11 provided in a cooling module 14 or located in parallel with an air conditioner condenser 25 to improve the cooling efficiency, or integrally formed with the air conditioner condenser 25 to simplify the structure.

Especially, it is preferable that a wick 26 be provided inside the pipe line 130 of the evaporative heat exchanger 100 such that the fluid flows by the capillary pressure regardless of the influence of gravity field, however, one will appreciate that such configuration is not essential to the present invention.

FIG. 12B shows an example of a cooling system for an internal combustion engine turbocharger configured using a line-integrated evaporative heat exchanger.

In the cooling system for the turbocharger, fluid is circulated through a turbocharger 27>a housing 140 in which an evaporative heat exchange unit 110 is mounted>an inlet>an internal combustion engine 10>an outlet>and the turbocharger 27. In this case, in an evaporative heat exchanger, a working fluid is circulated through the housing 140 in which the evaporative heat exchange unit 110 is mounted 110>a pipe line 130>a condensing heat exchange unit 120+a cooling fan 13>and the pipe line 130.

Accordingly, in the case of the turbocharger, the evaporative heat exchange unit of the evaporative heat exchanger is mounted integrally with a circulation line in the internal combustion engine exhaust gas circulation line connected through the turbocharger>the housing in which an evaporative heat exchange unit is mounted>the inlet>the internal combustion engine>the outlet>and the turbocharger to perform heat exchange with exhaust gas.

Here, the condensing heat exchange unit 120 of the evaporative heat exchanger 100 may be located in parallel with an air conditioner condenser 25 provided in a cooling module 14 to improve the cooling efficiency, or integrally formed with the air conditioner condenser 25 to simplify the structure. Furthermore, the condensing heat exchange unit 120 may be located at the rear of the air conditioner condenser 25 to optimize the cooling performance for each local area.

Especially, it is preferable that a wick 26 be provided inside the pipe line 130 of the evaporative heat exchanger 100 such that the fluid flows by the capillary pressure regardless of the influence of gravity field, however, one will appreciate that such configuration is not essential to the present invention.

Moreover, in order to improve the stability of the system by reducing the size of the pipe line, the evaporative heat exchange unit 110 in the housing 140 may be arranged in parallel with the condensing heat exchange unit 120 or integrally formed with the condensing heat exchange unit 120.

As described above, the evaporation cycle heat exchange system for the vehicle in accordance with the present invention has the following advantages:

1. Improvement in cooling efficiency: the amount of evaporative latent heat is about ten times greater than the amount of sensible heat in the conventional sensible heat exchanger, and thus a large amount of heat can be transferred, thus increasing the cooling efficiency.

Moreover, the evaporative/condensing heat exchanger has a thermal conductivity of about 98.5%, which is faster than a thermal conductivity of about 50% that the existing sensible heat exchange has, by vacuum superconducting heat transfer, and the vapor can be moved to the condensing portion at the sound speed.

Accordingly, the cooling efficiency is improved even in the case of a cooling system in which the temperature difference between fluids to be heat-exchanged is small compared to the conventional sensible heat exchanger.

2. Reduction in power consumption by the cooling fan: In the case of the fuel cell vehicle, it is possible to eliminate the 1 KW high voltage motor being currently used in the fuel cell system and use a cooling fan having a capacity of less than 250 W being currently used in the gasoline engine.

In the case of the internal combustion engine, it is possible to reduce the power consumption by the cooling fan.

3. Advantage in complying with pedestrian protection regulations and testing criteria of RCAR: in the case where the evaporation cycle heat exchange system of the present invention is applied to the internal combustion engine cooling system, it is possible to reduce the thickness of about 33 mm and the width of about 27 mm of the radiator by eliminating the radiator tank and reducing the size of the header.

In view of RCAR, in the case of a sport utility vehicle (SUV), when the insurance rate is reduced by one level with a reduction in size, an insurance fee of about 220,000 KRW can be saved per year.

4. Improvement in fuel efficiency: in the case where the evaporation cycle heat exchange system of the present invention is applied to the automatic transmission cooling system, the working fluid is not evaporated at low temperature and the cooling operation is not performed, which improves the warm-up performance of the oil temperature, thus improving the fuel efficiency. At high temperature, the cooling efficiency is improved, which prevents the oil temperature from excessively rising, thus preventing acidification of the oil.

5. Improvement in system stability: in the case of the cooling system in which the line-integrated evaporative heat exchanger is applied, it is possible to arrange the heat exchanger in the vicinity of the cooling module, and thus it is possible to shorten the length of a heat pipe used.

When the pipe is long, it may be damaged and leak. In this case, the boiling point is increased due to a depressurization of the pipe to reduce the cooling effect, and thus the pipe may be damaged due to overheat of a heat source.

6. Improvement in the degree of freedom in the cooling system design: the product-integrated or line-integrated evaporative heat exchanger can be easily applied to various vehicle components and various vehicle models, and thus it is possible to increase the degree of freedom of the design of the cooling system.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An evaporation cycle heat exchange system for a vehicle, the system comprising:
    an evaporative heat exchanger including an evaporative heat exchange unit, a condensing heat exchange unit, and a pipe line provided between both said heat exchange units to circulate a working fluid and perform heat exchange in such a manner that the working fluid is moved from one side to another side by a pressure difference caused by volume expansion and capillary phenomenon, and the working fluid on said one side is evaporated as its boiling point is lowered on said one side due to a lower pressure resulting from said pressure difference;
    wherein the evaporative heat exchange unit of the evaporative heat exchanger is integrally mounted inside an inverter, which forms an electronic component coolant circulation line for a hybrid vehicle, to perform heat exchange with coolant, the coolant circulation line extending through the inverter, a reservoir, an integrated starter/generator, a water pump, and the inverter; and
    wherein the coolant circulation line is separated from the pipe line and an end of the pipe line of the evaporative heat exchanger unit is provided with a wick to form the evaporative heat exchanger unit and the wick is mounted inside the component coolant circulation line of the inverter such that the working fluid inside the component coolant circulation line flows into the pipe line by capillary pressure regardless of influence of gravity field.

2. The system of claim 1, wherein a plurality of evaporative heat exchange units are arranged in parallel with one another in a coolant flow field inside the inverter.

3. The system of claim 1, wherein the condensing heat exchange unit of the evaporative heat exchange is located in front of an air conditioner condenser provided in a cooling module, located in parallel with the air conditioner condenser, or integrally formed with the air conditioner condenser.

* * * * *